United States Patent
Deshpande et al.

(10) Patent No.: US 11,057,498 B1
(45) Date of Patent: Jul. 6, 2021

(54) INTER-DATA CENTER DATA TRANSFER USING UNMANNED VEHICLES

(71) Applicant: Equinix, Inc., Redwood City, CA (US)

(72) Inventors: Chinmay Ashok Deshpande, Pittsburgh, PA (US); Kaladhar Voruganti, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 701 days.

(21) Appl. No.: 15/472,105

(22) Filed: Mar. 28, 2017

Related U.S. Application Data

(60) Provisional application No. 62/441,135, filed on Dec. 30, 2016.

(51) Int. Cl.
  *H04L 29/08* (2006.01)
  *G05D 1/00* (2006.01)

(52) U.S. Cl.
  CPC ........... *H04L 67/34* (2013.01); *G05D 1/0088* (2013.01); *H04L 67/10* (2013.01); *H04L 67/12* (2013.01)

(58) Field of Classification Search
  CPC ......... H04L 67/34; H04L 67/10; H04L 67/12; G05D 1/0088
  USPC ........................................................ 709/220
  See application file for complete search history.

(56) References Cited

U.S. PATENT DOCUMENTS

| | | | |
|---|---|---|---|
| 8,537,845 B2 | 9/2013 | Waldrop et al. | |
| 2010/0193626 A1* | 8/2010 | Goossen | B64C 37/00 244/2 |
| 2013/0297802 A1* | 11/2013 | Laribi | H04L 47/80 709/226 |
| 2013/0318214 A1* | 11/2013 | Tebay | H04L 67/06 709/219 |
| 2014/0254896 A1 | 9/2014 | Zhou et al. | |
| 2014/0277854 A1* | 9/2014 | Jones | G05D 1/102 701/3 |
| 2015/0120094 A1* | 4/2015 | Kimchi | G05D 1/00 701/3 |
| 2015/0269520 A1* | 9/2015 | Knapp | G06Q 10/08355 705/338 |

(Continued)

OTHER PUBLICATIONS

U.S. Appl. No. 15/475,957, filed Mar. 31, 2017, by Wagner et al.

(Continued)

*Primary Examiner* — Umar Cheema
*Assistant Examiner* — Tony Williams
(74) *Attorney, Agent, or Firm* — Shumaker & Sieffert, P.A.

(57) ABSTRACT

In one example, a method includes receiving, by a programmable network platform (PNP), a data transfer order for data from a first customer network located in a first data center to a second customer network located in a second data center; provisioning, by the PNP, a first interconnection from the first customer network to a first data transfer station of the first data center; notifying, by the PNP, the first customer network to send the data to the first data transfer station; directing, by the PNP, a transport vehicle to transport the data from the first data transfer station to a second data transfer station of the second data center; provisioning, by the PNP, a second interconnection from the second data transfer station to the second customer network; and notifying, by the PNP, the second customer network of the readiness of the data at the second data transfer station.

16 Claims, 8 Drawing Sheets

(56) References Cited

U.S. PATENT DOCUMENTS

| | | | |
|---|---|---|---|
| 2015/0379468 A1* | 12/2015 | Harvey | G06Q 10/08355 |
| | | | 705/338 |
| 2016/0127454 A1* | 5/2016 | Maheshwari | H04L 41/0803 |
| | | | 709/223 |
| 2016/0209839 A1* | 7/2016 | Hoareau | G05D 1/0027 |
| 2016/0308762 A1 | 10/2016 | Teng et al. | |
| 2016/0337175 A1* | 11/2016 | Rao | H04L 41/0803 |
| 2016/0337473 A1 | 11/2016 | Rao | |
| 2016/0344590 A1 | 11/2016 | Huey et al. | |
| 2016/0379167 A1* | 12/2016 | Raman | G06Q 10/1097 |
| | | | 705/338 |
| 2017/0078771 A1 | 3/2017 | Lingampalli | |

OTHER PUBLICATIONS

Rosen et al., "BGP/MPLS IP Virtual Private Networks (VPNs)," RFC 4364, Network Working Group, Feb. 2006, 47 pp.

Dhangar et al., "A New Effective Approach to Move Huge Data to Cloud-Minimizing Cost," International Conterence on Emerging Trends in Computer Engineering, Science and Information Technology—Special Issue of International Journal of Electronics, Communication & Soft Computing Science and Engineering, 2015 (Applicant points out, in accordance with MPEP 609.04(a), that the year of publication, 2015, is sufficiently earlier than the effective U.S. filing date, 2017, so that the particular month of publication is not in issue.) 5 pp.

Malliou et al., "Bulk Data Transfers Through an Airline Delay-Tolerant Network," The Tenth International Conference on Systems and Networks Communications, 2015, Published Feb. 20, 2016, 6 pp.

Laoutaris et al., "Delay Tolerant Bulk Transfers on the Internet," IEEE/ACM Transactions on Networking, vol. 21, No. 6, Dec. 2013, pp. 1852-1865.

"ECE 361: Problem Set 7: Problems and Solutions Wireless," University of Illinois, 361 Course Notes 21-24, Apr. 2016, 4 pp.

Cho et al., "Budget-Constrained Bulk Data Transfer via Internet and Shipping Networks," ICAC '11 Proceedings of the 8th ACM international conference on Autonomic computing, Jun. 14-18, 2011, 10 pp.

Cho et al., "New Algorithms for Planning Bulk Transfer via Internet and Shipping Networks," IEEE 30th Annual Conference on Distributed Computing Systems (ICDCS), Jun. 21-25, 2010, 10 pp.

Date, "Should You Upload or Ship Big Data to the Cloud?," acmqueue, vol. 14, No. 2, Mar.-Apr. 2016, 24 pp.

* cited by examiner

|            | 1Gbps   | 10Gbps | 100Gbps  |
|------------|---------|--------|----------|
| 62 miles   | 703 GB  | 7 TB   | 70 TB    |
| 125 miles  | 1.4 TB  | 14 TB  | 140.1 TB |
| 188 miles  | 2.1 TB  | 21 TB  | 211 TB   |
| 250 miles  | 2.8 TB  | 28 TB  | 281.2 TB |

INTER-DATA CENTER DATA TRANSFER USING UNMANNED VEHICLES

This application claims the benefit of U.S. Provisional Application No. 62/441,135, filed Dec. 30, 2016, the entire content of which is incorporated by reference herein.

TECHNICAL FIELD

The invention relates to data centers and, more specifically, to transferring data between data centers.

BACKGROUND

A network services exchange provider or co-location provider (a "provider") may employ a data center in which multiple customers of the provider locate network, server, and storage gear and interconnect to a variety of telecommunications and other network service provider(s) with a minimum of cost and complexity. Such customers are said to be "co-located" in the data center. A data center may be shared by the multiple tenants locating networking equipment within the data center. With IT and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, one or more data centers employed by the provider include an interconnection system that provides interconnection services by which customers of the provider may interconnect to one another over the interconnection system infrastructure or by which a customer of the provider may interconnect its spatially and/or geographically distributed customer networking equipment over the data center infrastructure. The data centers may in such cases be referred to as "interconnection facilities" or "co-location and interconnection facilities." A provider may provide services accessible to co-located customers via an interconnection, such services including, for example, a cloud exchange, Internet access, an Internet exchange, "metro connect" for reaching other communication facilities within a metropolitan area, a cross-connect from one customer to another, and other interconnection services. Interconnections may represent connections between customer networks for inter-customer interconnections (between different customers) or intra-customer interconnections (between areas of one or more interconnection center(s) that are operated/leased by a single customer).

Cloud computing refers to the use of dynamically scalable computing resources accessible via a network, such as the Internet. The computing resources, often referred to as a "cloud," provide one or more services to users. These services may be categorized according to service types, which may include, for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS), Platform-as-a-Service (PaaS), and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers. An interconnection system may interconnect cloud customers and cloud service providers using a cloud exchange, for example.

SUMMARY

In general, techniques are described for transferring data between two data centers for one or more customers of a data center provider using an unmanned vehicle. For example, an interconnection system may include two or more data centers and a programmable network platform for coordinating data transfer between the interconnection facilities. One or more customers of the data center provider may co-locate multiple customer networks at respective data centers of the data center provider to receive services. That is, each data center may include at least one customer network that is co-located at the data center. Each data center may also include a data transfer station and a network switch fabric for dynamically interconnecting the at least one customer network to the data transfer station for transfer of data between the at least one customer network and an unmanned vehicle. The programmable network platform may coordinate respective interconnections between the at least one customer network and the data transfer station as well as movement of the unmanned vehicle between data transfer stations. Each data transfer station may be configured to transfer data to and from physical media for transport by an unmanned vehicle from a data transfer station of a data center to a data transfer station of another data center. By coordinating the interconnection, intra-data center data transfer operation, and inter-data center data transfer operation, the programmable network may enable transferring data between customer networks co-located at different data centers without requiring a network connection between the data centers using, e.g., a network service provider network.

In some examples, the programmable network platform may receive and evaluate a data transfer request by a customer and select a data transfer process from among an unmanned vehicle data transfer and one or more other data transfer services, such as a temporary metro connection for data transfer. The programmable network platform may evaluate information from the data transfer request such as size of the data transfer, cost of the data transfer, and timing of the data transfer for at least the unmanned vehicle data transfer and another data transfer service. The programmable network platform may select the data transfer service for the data transfer request based on one or more customer preferences, such as transfer cost or transfer time reduction.

The techniques may provide one or more advantages. For example, transferring large amounts of data by physically transporting a physical media using an unmanned vehicle may be faster, less expensive, and more secure than transferring large amounts of data using a network connection.

In one example, a method includes receiving, by a programmable network platform, a data transfer order for data from a first customer network located in a first data center to a second customer network located in a second data center; provisioning, by the programmable network platform, a first interconnection from the first customer network to a first data transfer station of the first data center; notifying, by the programmable network platform, the first customer network to send the data to the first data transfer station; receiving, by the first data transfer station, the data and storing the data to a storage media associated with the first data transfer station; directing, by the programmable network platform, a transport vehicle to transport the data from the first data transfer station to a second data transfer station of the second data center; receiving, by the second data transfer station, the data from the transport vehicle; provisioning, by the programmable network platform, a second interconnection from the second data transfer station to the second customer network; notifying, by the programmable network platform, the second customer network of the readiness of the data at the second data transfer station; and transmitting, by the second data transfer station, the data to the second customer network.

In another example, an interconnection system includes a first data center that includes a first data transfer station configured to receive data from a first customer network located in the first data center and transmit the data to a transport vehicle; a second data center that includes a second data transfer station configured to receive the data from the transport vehicle and transmit the data to a second customer network located in the second data center; and a programmable network platform configured to: receive a data transfer order for data from the first customer network to the second customer network; provision a first interconnection from the first customer network to the first data transfer station; notify the first customer network to send the data to the first data transfer station; direct a transport vehicle to transport the data from the first data transfer station to the second data transfer station; provision a second interconnection from the second data transfer station to the second customer network; and notify the second customer network of readiness of the data at the second data transfer station.

In another example, a computing device includes at least one programmable processor operably coupled to a memory and a programmable network platform for a first data center and a second data center. The programmable network platform is configured for execution by the at least one programmable processor to: receive a data transfer order for data from a first data center to a second data center; provision a first interconnection from a first customer network to a first data transfer station of the first data center, wherein the first customer network is located in the first data center; notify the first customer network to send the data to the first data transfer station; direct a transport vehicle to transport the data from the first data transfer station to a second data transfer station of the second data center; provision a second interconnection from the second data transfer station to a second customer network located in the second data center; and notify the second customer network of the readiness of the data at the second data transfer station.

In another example, a method includes receiving, by a programmable network platform, a data transfer order for data from a first customer network located in a first data center to a second customer network located in a second data center; provisioning, by the programmable network platform, a first interconnection from the first customer network to a first data transfer station of the first data center; notifying, by the programmable network platform, the first customer network to send the data to the first data transfer station; directing, by the programmable network platform, a transport vehicle to transport the data from the first data transfer station to a second data transfer station of the second data center; provisioning, by the programmable network platform, a second interconnection from the second data transfer station to the second customer network; and notifying, by the programmable network platform, the second customer network of the readiness of the data at the second data transfer station.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
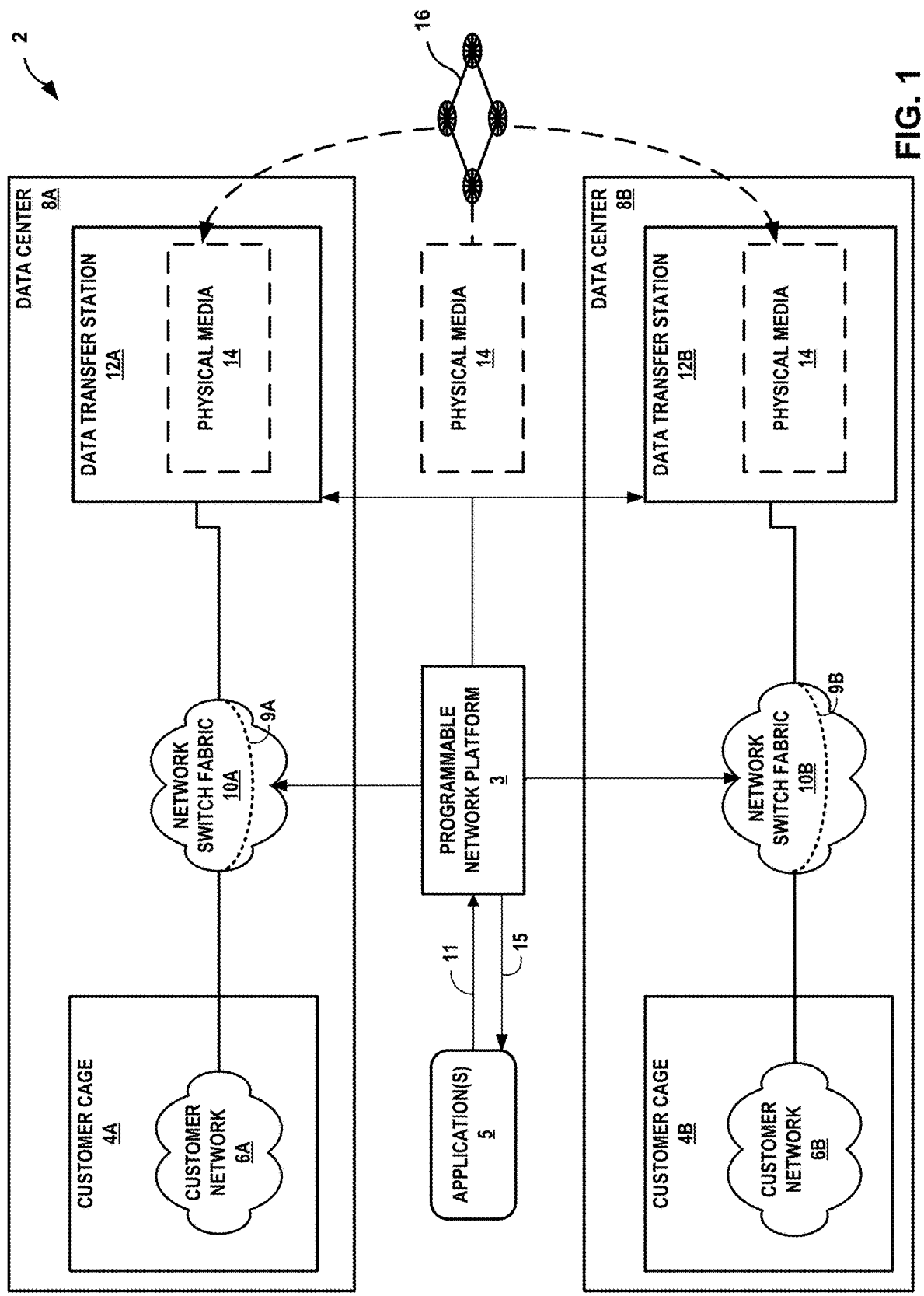
FIG. 1 is a block diagram illustrating a high-level view of an example interconnection system having a programmable network platform that offers unmanned vehicle data transfer between customer networks of respective interconnection facilities, in accordance with techniques described herein.

FIG. 1 is a block diagram that illustrates a high-level view of an interconnection system 2 having a programmable network platform 3 that offers data transfer services to customers of a data center provider, in accordance with techniques described herein. Interconnection system 2 depicts two data centers 8A-8B (collectively, "data centers 8") operated by the data center provider, the data centers 8 each having a network switch fabric 10A-10B (collectively, "network switch fabrics 10"), respectively, configurable for interconnecting customer networks 6A-6B (collectively, "customer networks 6") located within multiple customer cages 4A-4B (collectively, "customer cages 4"), respectively, to data transfer stations 12A-12B (collectively, "data transfer stations 12"), respectively. In some instances, each of customer cages 4 may be associated with a different customer of the data center provider. In some instances, customer cages 4 are both associated with a single customer of the data center provider.

As used herein, the term "customer" of the data center provider may refer to a tenant of at least one of the data centers 8 deployed by the data center provider, whereby the customer leases space within at least one of the data centers 8. The customer may do so to co-locate with other tenants for improved efficiencies over independent facilities as well as to interconnect network equipment with the other tenants' network equipment within the data center or campus for reduced latency/jitter and improved reliability, performance, and security versus transport networks, among other reasons. The data center provider may in some cases be referred to as an interconnection system provider in that these will typically be the same entity. Customer networks 6 may each include customer network equipment and form an L2, L3, or L2/L3 network. Customers of the data center provider may include enterprises, network service providers, managed service providers, resellers, cloud service providers, and wholesalers, for instance.

In the data centers 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the data centers 8 or, e.g., another data center managed by the data center provider.

Each of cages 4 are installed by the data center provider and provide a secure structure and location for a customer to store and access their customer networks 6, while also having access to network switch fabrics 10, e.g., via a customer side of a patch panel (not shown) situated within the cage 4 mesh that defines a cage boundary or "demarcation" within the data center, in that the customer alone has access to the cage interior. Such patch panels (more simply and hereinafter, "panels") may also provide the data center provider with convenient and secure access to a provider side of the panels. For example, the provider may be able to access the provider-sides of panels for cages 4 without accessing the interior of cages 4. Likewise, the customers leasing or otherwise having access to the interiors of cages 4 may be able to access the customer sides of panels but may be prevented from accessing the provider sides of panels. In some examples, the provider may be able to access a secure hallway between cages 4, which may allow access to the provider side of the panels.

Data transfer stations 12 may represent data transfer infrastructure to transfer data to and from physical media 14 for transport of the data from one of data centers 8 to another of data centers 8 by an unmanned transport vehicle 16. Data transfer stations 12 may have ports for interconnecting data transfer stations 12 to customer networks 6 through interconnections 9A-9B (collectively, "interconnections 9"). Data transfer stations 12 may be configured to receive data from customer networks 6 and store the data to storage media associated with the respective data transfer station 12. Data transfer stations 12 may be further configured to receive data from transport vehicle 16 and transmit the data to customer networks 6. Data transfer stations 12 may be described in more detail in FIG. 2 below.

Transport vehicle 16 may represent an unmanned vehicle for transporting physical media 14 between data transfer stations 12 of respective data centers 8. Transport vehicle 16 may be configured to interface with data transfer stations 12 to receive data from and deliver data to data transfer stations 12. In some examples, transport vehicle 16 may include automated vehicles, such as drones configured for autonomous air or ground travel. Transport vehicle 16 is described in more detail in FIG. 2 below.

Network switch fabrics 10 represent network switching infrastructure including, e.g., layer 3 (L3) and layer 2 (L2) forwarding elements, which may include one or more routers, switches, and other L3/L2 forwarding devices. Data center 8 may include one or more real servers that offer one or more compute/computing farms that offer services to customers associated with cages 4 and/or apply services to service traffic via network switch fabrics 10. Network switch fabrics 10 may be configured to provide interconnection services to customer networks 6 for a customer, e.g., a carrier/NSP, co-location customer, cloud service provider, or cloud service customer, via ports of network switches. For example, a port of a network switch may be configured to allow direct exchange of network traffic between the customer network 6A and data transfer station 12A upon the provisioning of interconnection 9A, in order to enable data transfer from customer network 6A to data transfer station 12A. A network switch may represent an L2, L3, or L2/L3 switch, router, or other network devices. Network switch fabrics 10 may include many hundreds or thousands of ports for many tens or hundreds of switches and routers deployed by the data center 8 provider and networked to provide network switch fabrics 10.

In some examples, network switch fabrics 10 may include optical and photonic switching infrastructure. Additional information regarding examples of network switch fabric is found in U.S. patent application Ser. No. 14/868,177, filed Sep. 28, 2015 and entitled "Active Panel Demarcation;" and in U.S. patent application Ser. No. 14/937,787, filed Nov. 10, 2015 "Automated Fiber Cross-connect Service within a Multi-Tenant Data center;" each of which are incorporated by reference in their respective entireties.

Further example details of a facility that provides a cloud-based services exchange are found in U.S. patent application Ser. No. 15/099,407, filed Apr. 14, 2016 and entitled "Cloud-Based Services Exchange;" and in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 15/001,766, filed Jan. 20, 2016 and entitled "Multi-cloud, Multi-service Data Model." Further example details of a facility that provides a carrier Ethernet exchange are found in U.S. Pat. No. 8,537,845 entitled "REAL TIME CONFIGURATION AND PROVISIONING FOR A CARRIER ETHERNET EXCHANGE," filed Sep. 13, 2012. Each of the above patents and patent applications are incorporated herein by reference in their respective entireties. Further example details of a facility that provides an inter-metro backhaul are found in U.S. Appln Ser. No. 62/317,281, filed Apr. 1, 2016, entitled INTER-METRO CONNECTIVITY NETWORK CONNECT.

Interconnection system 2 further includes a programmable network platform (PNP) 3, alternatively referred to herein as an "interconnection platform." Programmable network platform 3 may expose a software interface that defines the methods, fields, and/or other software primitives by which application(s) 5 may invoke PNP 3 to submit data transfer orders and receive notifications of data transfer status. In this way, PNP 3 may allow customers, carriers, network service providers (NSPs), and/or the data center provider itself with the programmatic capability of requesting a data transfer for a customer via a portal or other application.

Programmable network platform 3 may represent an application executing within one or more data centers of system 2 or alternatively, off-site/remotely at a back office or branch of the data center provider, for instance. Although shown as administering two data centers 8, programmable network platform 3 may control interconnection provisioning associated with data transfer for multiple different interconnection facilities. Alternatively or additionally, multiple separate instances of the programmable network platform 3 may control interconnection provisioning associated with data transfer for respective multiple different interconnection facilities.

Application(s) 5 represents at least one application that communicates with PNP 3 to request a data transfer for a customer. Application(s) 5 represent client-side software for interfacing with PNP 3 and may include a customer portal, customer applications, a data center provider application that is accessible only to data centers 8 operators, or a console such as a command-line interface or graphical user interface. Users or clients of application(s) 5 may include enterprise customers, cloud service and content providers, carriers, network service providers (NSPs), and/or the data center provider itself, for instance. In some cases, application 5 and PNP 3 may represent different functions or modules of the same application.

The following example may represent a data transfer of data from data center 8A to data center 8B; however, the operation of interconnection system 2 may involve other components. A user, such as a customer, enters data transfer request data for a data transfer order via an interface of an application of application(s) 5 for transfer of data from customer network 6A located in data center 8A to customer network 6B located in data center 8B. Upon submission of the data transfer request, the application of application(s) 5 issues, to PNP 3, a data transfer order 11 that specifies parameters for a data transfer through network switch fabrics 10 and/or data transfer stations 12. Data transfer order 11 may include information about the data transfer that may include size information, such as size of the data in the data transfer, location information, such as a source location and a target destination of the data transfer, and time information, such as a requested time of delivery of the data. In some examples, data transfer order 11 may specify port information associated with interconnection 9A for the data transfer, for instance, a bandwidth or data rate and protocol, a start date at which the port should be operational, an end date at which the port should be torn down (potentially indefinite until the contract term expires), port identifiers for panel ports at demarcation panels of customer cages 4, identifiers or locations for data centers 8 (e.g., metropolitan area and data center name), port form factor/model (e.g., RJ45, optical form-factor), physical layer standard/protocol (e.g., GigE, SONET/SDH), and other port configuration parameters. A port may represent a port configured to connect interconnections 9 with customer networks 6 to exchange data.

In response to receiving data transfer order 11, PNP 3 may provision interconnection 9A from customer network 6A to data transfer station 12A. PNP 3 may determine an appropriate, available port of data transfer station 12A for data transfer order 11 and may reserve the port for interconnection 9A. In some examples, interconnections 9 may include cross-connects that represent a Layer 0 ("L0") connection in that a physical cross-connect underlies the Open Systems Interconnection (OSI) model or TCP/IP model for packet networking. Interconnections 9 may underlie an optical transport network (OTN) layer that (typically in conjunction with a SONET/SDH layer) provides Layer 1 ("L1") connectivity between optical networking devices such as wavelength division multiplexing (WDM) devices or may underlie an Ethernet layer that provides L1 connectivity. In some examples, interconnections 9 include cross-connects that underlie a layer 2 ("L2") or layer 3 ("L3") service provided by the data center provider to interconnect customer cages 4 according to an L2 or L3 service. In other examples, interconnections 9 may be L2/L3 connections through network switch fabrics 10. Interconnections 9 may include a virtual circuit over pre-provisioned cross-connects from customer network 6A to network switch fabric 10A and from network switch fabric 10A to data transfer station 12A, as described in further detail below.

PNP 3 configures a port of data transfer station 12A by issuing configuration commands either directly by way of configuration interfaces of network control elements, or indirectly to such elements via software-defined networking (SDN) controllers that manage the elements on behalf of the PNP 3. PNP 3 may in some instances be alternatively referred to as an orchestrator in that PNP 3 orchestrates SDN controllers so as to configure switches and/or other elements of network switch fabrics 10 and/or data transfer stations 12.

Once PNP 3 has provisioned interconnection 9A, PNP 3 may notify customer network 6A that interconnection 9A has been established and that customer network 6A may send data to data transfer station 12A. Customer network 6A may send data to data transfer station 12A, and data transfer station 12A may receive the data from customer network 6A. Data transfer station 12A may store the data on storage media associated with data transfer station 12A. In some examples, the storage media may be a temporary storage media for data before the data is transferred to physical media 14. In other examples, the storage media may be physical media 14.

After transfer of the data to physical media 14, PNP 3 may direct transport vehicle 16 to transport the data from data transfer station 12A to data transfer station 12B. PNP 3 may send the location information from the data transfer order 11 to a controller operating transport vehicle 16. In examples where transport vehicle 16 is an unmanned vehicle, PNP 3 may direct transport vehicle 16 by sending location information, such as a location of the data centers 8, time information, such as time of data receipt and data delivery, and connection information, such as connection type, to a controller for transport vehicle 16. Upon arrival at data center 8B, transport vehicle 16 may interface with data transfer station 12B to send the data to data transfer station 12B.

Data transfer station 12B may receive the data from transport vehicle 16. In some examples, data transfer station 12B may store the data from physical media 14 to a storage media associated with data transfer station 12B, while in other examples, data storage station 12B may receive physical media 14.

PNP 3 may provision interconnection 9B from customer network 6B to data transfer station 12B. PNP 3 may determine an appropriate, available port of data transfer station 12B for data transfer order 11 and may reserve the port for interconnection 9B. PNP 3 may configure elements of data transfer station 12B by issuing configuration commands either directly by way of configuration interfaces of network control elements, or indirectly to such elements via software-defined networking (SDN) controllers that manage the elements on behalf of the PNP 3.

Once PNP 3 has provisioned interconnection 9B, PNP 3 may notify customer network 6B that interconnection 9B has been established and that customer network 6B may retrieve data from data transfer station 12B via interconnection 9B.

The process described above may be performed in response to a determination, by PNP 3, of a data transfer through transport vehicle 16 as a data transfer method for the data transfer in response to data transfer order 11. Interconnection system 2 may include other data transfer methods for transferring data from one data center to another. For example, data center 8A may be connected to data center 8B for data transfer through an intra-metro network, such as a metro-connect that traverses a network service provider network.

Upon receiving the data transfer order 11, PNP 3 may determine a data transfer method for the data transfer from at least an unmanned vehicle transfer method, such as the method described above or in FIG. 4, and a network transfer method, such as a metro-connect. PNP 3 may determine a transfer time and/or a transfer cost from size information of the data, time information of the data transfer order, and location information of the data transfer order, for each of the unmanned vehicle transfer method and the network transfer method such as a temporary metro connect service. The programmable network platform may select a data transfer method for data transfer order 11 based on a customer preference, such as transfer time reduction or transfer cost reduction, and based on the transfer time and/or transfer cost. In some examples, PNP 3 may transfer some data from data transfer order 11 through transport vehicle 16 and transfer other data from data transfer order 11 through a temporary metro-connect connection.

In some examples, interconnection system 2 may be configured to simultaneously transfer data for more than one data transfer order using transport vehicle 16. Data transfer stations 12 may be configured to aggregate data for more than one data transfer order from multiple customer networks and coordinate transmission of the data to and from the transport vehicle 16. For example, first data transfer station 12A may be configured to store first data for a first data transfer order and second data for a second data transfer order on the storage media. PNP 3 may direct the transport vehicle to transport the first data and the second data from data transfer station 12A to data transfer station 12B according to any one of time information, location information, size information, and customer preference information for each of the first data order and the second data order. By aggregating data from multiple customer networks and delivering the data to one or more data centers, interconnection system 2 may reduce the cost of data transfer for each customer.

In some examples, interconnection system 2 may be configured to transfer data to more than one data transfer station in a single trip of the transport vehicle. For example, data transfer orders consolidated into a single trip may include data of a single customer for multiple data centers (e.g., the same data for multiple data centers or different data for each of multiple data center) or data for multiple customers at multiple data centers. In the example above, if second data is to be delivered to a third data transfer station rather than to data transfer station 12B, PNP 3 may direct the transport vehicle to transport the second data from data transfer station 12B to the third data transfer station after delivering the first data to data transfer station 12B, according to any one of time information, location information, size information, and customer preference information for each of the first data order and the second data order. By delivering data to two or more data centers in the same trip, interconnection system 2 may reduce the cost of data transfer or travel time of data transfer.

In some examples, interconnection system 2 may be configured to transport data for a single data transfer order to a single data center in multiple trips of the transport vehicle. Data transfer stations 12 may be configured to manage data for a data transfer order that may be greater than a capacity of transport vehicle or a storage media and coordinate transmission of the data to and from the transport vehicle 16 for more than one trip. For example, if data may not be transported by transport vehicle in a single trip, data transfer station 12A may be configured to store a first portion of the data on a storage media. PNP 3 may direct the transport vehicle to transport the first portion of the data from data transfer station 12A to data transfer station 12B. PNP 3 may direct the transport vehicle to return to data transfer station 12A, which may include a second data transfer order for data from data transfer station 12B to data transfer station 12A, such as for another customer. Data transfer station 12A may be configured to store a second portion of the data on the storage media. PNP 3 may direct the transport vehicle to transport the second portion of the data from data transfer station 12A to data transfer station 12B. By managing data for multiple trips among one or more customers, interconnection system 2 may reduce the cost of data transfer.

In some examples, interconnection system 2 may be configured to generate transport schedules for one or more transport vehicles to transfer data. The transport schedules may include real-time information of transport vehicles and data transfer schedules, such as for on-demand data transfers. In addition to on-demand data transfers, data centers may operate scheduled data transfers, such as for small data transfer orders from multiple customers. The schedules may include travel time information for the transport vehicles that includes real-time location and congestion information of the transport vehicles, as well as external information such as weather information.

Physical transfer of data by transport vehicle 16 may provide customers of interconnection system 2 a fast and/or inexpensive method of transferring data between customer networks 6 located on two different interconnection facilities 12.

Figure 2:
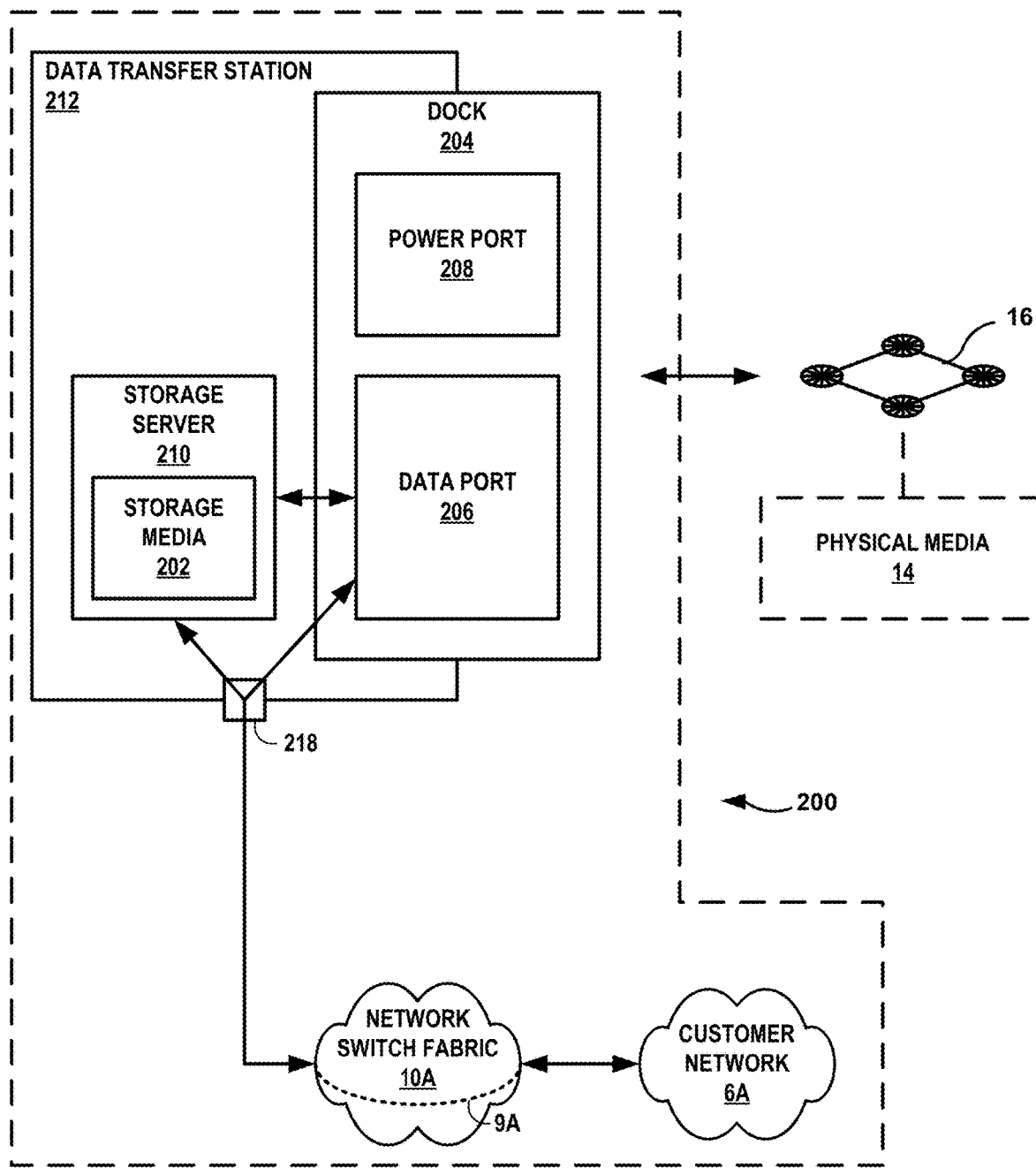
FIG. 2 is a block diagram that illustrates a high-level view of a data transfer station of a data center that offers data transfer services with a customer of the data center, in accordance with techniques described herein.

FIG. 2 is a block diagram that illustrates a high-level view of a data transfer station 212 of a data center 200 that offers data transfer services to a customer of the data center in accordance with techniques described herein. FIG. 2 may reference elements of FIG. 1; data center 200 may correspond to data center 8A and data transfer station 212 may correspond to data transfer station 12A.

Data transfer station 212 include a storage server 210, a dock 204, and at least one port 218. Storage server 210 may include a storage media 202. Storage media 202 may include storage devices to store data received by storage server 210 at data transfer station 212, such as by data port 206 or port 218. In some examples, storage media 202 may temporarily store data received by data transfer station 212 for storage to or from physical media 14. In some examples, storage media 202 may be physical media 14. Storage media 202 may include magnetic disk storage such as HDDs and tapes, flash drives such as SSDs, optical storage such as compact discs (CDs) or digital video discs (DVDs), or other long-term physical storage media. Storage server 210 may include hardware for supporting storage media 202.

Dock 204 may be configured to interface with transport vehicle 16 to receive data from and send data to transport vehicle 16. Dock 204 may include a power port 208 for powering transport vehicle 16 and at least one data port 206 for transfer data to and from transport vehicle 16.

In some examples, data transfer station 212 may receive physical media 14 by taking custody of physical media 14 from transport vehicle 16. Physical media 14 may be removed from transport vehicle 16 during data transfer and connected to data port 206 by dock 204. Data transfer station 212 may include hardware for interfacing physical media 14 with data port 206. In examples where physical media 14 includes hardware for writing data to and reading data from the physical media 14, such as an HDD, data transfer station 212 may include a connection for physical media 14 into data port 206. In examples where physical media 14 does not include hardware for writing data to and reading data from the physical media 14, such as optical media, data transfer station 212 may include hardware for receiving physical media 14 and writing the data to or reading the data from the physical media 14, such as an optical drive. Such hardware may include magnetic storage devices such as HDDs and tape drives, flash drives such as solid-state drives (SSDs), optical drives such as CD-ROM drives, or other storage devices.

In some examples, data transfer station 212 may receive physical media 14 by providing a connection to physical media 14 without taking custody of physical media 14 from transport vehicle 16. Physical media 14 may remain mechanically connected to transport vehicle 16 during data transfer. Data transfer station 212 may include a connection for physical media 14 on transport vehicle 16 into data port 206. For example, data transfer station 212 may include a connection port for connecting a hard disk drive (HDD) to data port 206.

Dock 204 may include security structures for securing custody of physical media 14 to and from transport vehicle 16. Security structures may include, for example, cages for receiving physical media 14. The security structures may interface with a data transfer mechanism of data transfer station 212 to prevent transfer of data until a particular security condition is established, such as a door of the security structure latching. In some examples, physical media 14 may include a case for protecting physical media 14 and/or limiting physical access to physical media 14. By integrating security features such as security structures for data transfer station 212, interconnection system 2 may improve the line of custody of data physically transferred from one data center to another data center.

In some examples, data transfer station 212, transport vehicle 16, or both, may include supporting hardware for connecting physical media 14 to data transfer station 212. Supporting hardware may include hardware for securing and connecting the physical media 14. For example, data transfer station 212 may include a robot for receiving, orienting, and/or coupling physical media 14, such as an HDD, to a connection port. In examples where data transfer station 212 are configured to receive more than one type of physical media 14, the supporting hardware may include sensors for determining the type of physical media 14.

Transport vehicle 16 may be configured to transport data from and to data transfer station 212. In some examples, transport vehicle may include autonomous vehicles, such as unmanned aerial vehicles and unmanned ground vehicles. In some examples, transport vehicle 16 may include non-autonomous vehicles, such as delivery trucks. For example, transport vehicle 16 may be a commercial carrier that may receive physical media 14 from and deliver physical media 14 to data transfer station 212.

Physical media 14 may represent long-term storage media configured for movement to and from data transfer station 212 of data center 200 to another physical transfer station of another data center. Characteristics of physical media 14 may include a media type, a media capacity, and a media weight. For example, physical media 14 may be a solid-state drive type having a one terabyte capacity and a 78 gram weight. In some examples, dock 204 may be configured to receive a variety of physical media 14. Physical media 14 may include magnetic disk storage such as HDDs and tapes, flash drives such as SSDs, optical storage such as compact discs (CDs) or digital video discs (DVDs), or other long-term physical storage media.

In examples where physical media 14 is mechanically connected to transport vehicle 16 during data transfer, transport vehicle 16 may include a connector for interfacing physical media 14 with data port 206 to transfer data from physical media 14 to storage media 202 or port 218. In examples where physical media 14 is not mechanically connected to transport vehicle 16 during data transfer, transport vehicle 16 may include hardware configured to deliver physical media 14 into custody of dock 204. Once in custody, dock 204 may connect physical media 214 to data connection 206, such as directly or through hardware, and transfer data from physical media 14 to storage media 202 or port 218 through data connection 206.

Port 218 may represent a port of data transfer station 212 by which interconnection 9A may be connected to transfer data to and from customer network 6A. Port 218 may be configured by PNP 3 to receive and send data by and from data transfer station 212. Port 218 may be configured to send and receive data to and from storage media 202, data connection 206, or both.

Figure 3A:
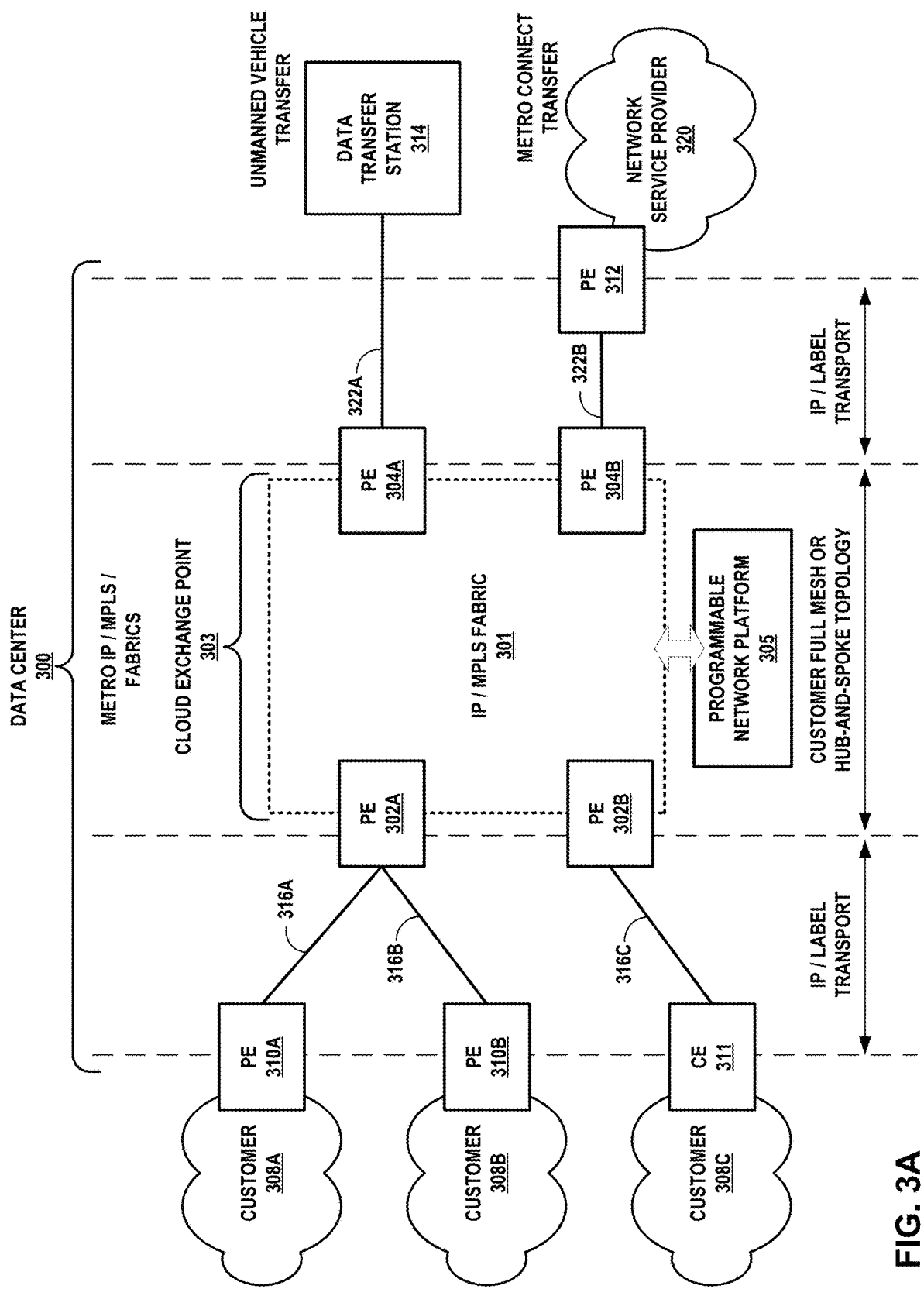
FIGS. 3A-3B are block diagrams that illustrate example network infrastructure for a cloud exchange that aggregates services for provisioning to customers of the data center provider and aggregates access for multiple customers, in accordance with techniques described in this disclosure.
Figure 3B:
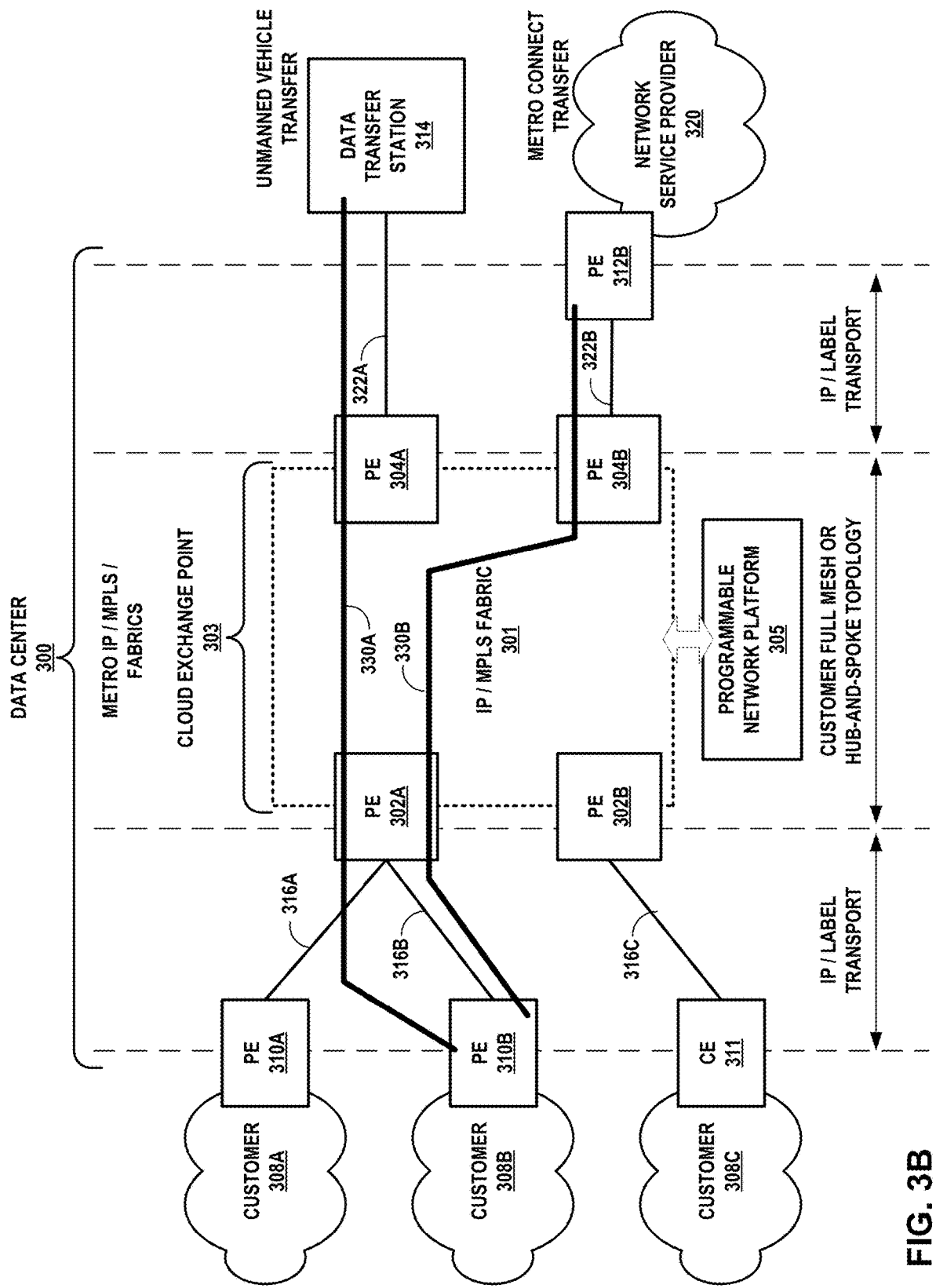

FIGS. 3A-3B are block diagrams that illustrate example network infrastructure for a cloud exchange that aggregates the services of for provisioning to customers of the data center provider and aggregates access for multiple customers, in accordance with techniques described in this disclosure. In this example, customer networks 308A-308C (collectively, "customer networks 308"), each associated with a different customer, access a cloud exchange point within a data center 300 in order receive data transfer services. Customer networks 308 each include endpoint devices that generate and/or consume data. Example endpoint devices include servers, smart phones, television set-top boxes, workstations, laptop/tablet computers, video gaming systems, teleconferencing systems, media players, and so forth.

Customer networks 308A-308B may include respective provider edge/autonomous system border routers (PE/ASBRs) 310A-310B. Each of PE/ASBRs 310A, 310B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 310A and PE 302A may directly peer via an exterior gateway protocol, e.g., exterior BGP, to exchange L3 routes over access link 316A and to exchange L3 data traffic between customer network 308A and network service provider 320 and/or data transfer station 314. Access links 316 may in some cases represent and alternatively be referred to as attachment circuits for IP-VPNs configured in IP/MPLS fabric 301, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g., QinQ), a VxLAN, an LSP, a GRE tunnel, or other type of tunnel.

While illustrated and primarily described with respect to L3 connectivity, PE routers 302 may additionally offer, via access links 316, L2 connectivity between customer networks 308 and network service provider 320 and/or data transfer station 314. For example, a port of PE router 302A may be configured with an L2 interface that provides, to customer network 308A, L2 connectivity to cloud service provider 320A via access link 316A, with the cloud service provider 320A router 312A coupled to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to both network service provider 320 and data transfer station 314 in some cases.

To create an L2 interconnection between a customer network 308 and network service provider 320 or data transfer station 314, in some examples, IP/MPLS fabric 301 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a port facing network service provider 320 or data transfer station 314. In some cases, network service provider 320 or data transfer station 314 and customer 308 may have access links to the same PE router 302, 304, which bridges the L2 traffic using the bridge domain.

To create an L3 interconnection between a customer network 308 and network service provider 320 or data transfer station 314, in some examples, IP/MPLS fabric 301 is configured with L3 virtual routing and forwarding instances (VRFs).

Each of access links 316 and aggregation links 322 may include a network interface device (NID) that connects customer network 308 or cloud service provider 328 to a network link between the NID and one of PE routers 302, 304. Each of access links 316 and aggregation links 322 may represent or include any of a number of different types of links that provide L2 and/or L3 connectivity.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 310A-310B may alternatively be or otherwise represent CE devices.

Access links 316 include physical links. PE/ASBRs 310A-310B, CE device 311, and PE routers 302A-302B exchange L2/L3 packets via access links 316. In this respect, access links 316 constitute transport links for cloud access via cloud exchange point 303. Cloud exchange point 303 may represent an example of a cloud exchange point, as described in U.S. patent application Ser. No. 15/099,407, referenced above. Data center 300 may represent an example of any of data centers 8A, 8B of FIG. 1.

Cloud exchange point 303, in some examples, aggregates customers 308 access to the cloud exchange point 303 and thence to any one or more network service provider 320 and data transfer station 314. FIGS. 3A-3B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MIPLS fabric 301 may be configured according to techniques described herein to interconnect any of access links 316 to any of cloud aggregation links 322. As a result, data transfer station 314, e.g., needs only to have configured a single cloud aggregate link (here, access link 322A) in order to provide services to multiple customer networks 308. That is, the data transfer station 314 does not need to be provisioned with separate service links from data transfer station 314 to each of PE routers 310, 311, for instance, in order to provide services to each of customer network 308. Cloud exchange point 303 may instead cross-connect cloud aggregation link 322A and PE 312A of cloud service provider network 320A to multiple cloud access links 316 to provide layer 3 peering and network reachability for the cloud services delivery.

In addition, a single customer network, e.g., customer network 308A, need only to have configured a single cloud access link (here, access link 316A) to the cloud exchange point 303 within data center 300 in order to obtain services from multiple cloud service provider networks 320 offering cloud services via the cloud exchange point 303. That is, the customer or network service provider operating customer network 308A does not need to provision and configure separate service links connecting customer network 308A to different PE routers 312, for instance, in order to obtain services from multiple cloud service provider networks 320. Cloud exchange point 303 may instead cross-connect cloud access link 316A (again, as one example) to multiple cloud aggregate links 322 to provide layer 3 peering and network reachability for the cloud services delivery to customer network 308A.

Network service provider 320 includes PE router 312 that each executes an exterior gateway routing protocol, e.g., eBGP, to exchange routes with PE router 304 of cloud exchange point 303.

In the illustrated example, an Internet Protocol/Multiprotocol label switching (IP/MPLS) fabric 301 interconnects PEs 302 and PEs 304. IP/MPLS fabric 301 include one or more switching and routing devices, including PEs 302, 304, that provide IP/MPLS switching and routing of IP packets to form an IP backbone. In some example, IP/MPLS fabric 301 may implement one or more different tunneling protocols (i.e., other than MPLS) to route traffic among PE routers and/or associate the traffic with different IP-VPNs. In accordance with techniques described herein, IP/MPLS fabric 301 implement IP virtual private networks (IP-VPNs) to connect any of customers 308 with data transfer station 314 and/or network service provider 320 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and interconnects data transfer station 314 and/or network service provider 320 to customers 308 within the high-bandwidth local environment of data center 300 provided by a data center-based IP/MPLS fabric 301. In some examples, IP/MPLS fabric 301 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and data transfer station 314 or network service provider 320 may connect via respective links to the same PE router of IP/MPLS fabric 301.

Access links 316 and aggregation links 322 may include attachment circuits that associate traffic, exchanged with the connected customer network 308 or data transfer station 314 and/or network service provider 320, with virtual routing and forwarding instances (VRFs) configured in PEs 302, 304 and corresponding to IP-VPNs operating over IP/MPLS fabric 301. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with PE 312A on a bidirectional label-switched path (LSP) operating over access link 322A, the LSP being an attachment circuit for a VRF configured in PE 304A. Each VRF may include or represent a different routing and forwarding table with distinct routes.

PE routers 302, 304 of IP/MPLS fabric 301 may be configured in respective hub-and-spoke arrangements for cloud services, with PEs 304 implementing cloud service hubs and PEs 302 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 301 and for southbound service traffic (i.e., from a CSP to a customer) PEs 302 advertise routes, received from PEs 310, to PEs 304, which advertise the routes to PEs 312. For northbound service traffic (i.e., from a customer to a CSP), PEs 304 advertise routes, received from PEs 312, to PEs 302, which advertise the routes to PEs 310.

For some customers of cloud exchange point 303, the cloud exchange point 303 provider may configure a full mesh arrangement whereby a set of PEs 302, 304 each couple to a different customer site network for the customer. In such cases, the IP/MPLS fabric 301 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 310 and PEs 312 may not peer directly with one another to exchange routes, but rather indirectly exchange routes via IP/MPLS fabric 301. In the example of FIG. 3B, cloud exchange point 303 is configured to optionally implement layer 3 virtual circuits 330A or 330B (collectively, "virtual circuits 330") to interconnect customer network 308 with one of data transfer station 314 or network service provider 320 with an end-to-end IP path. Each of data transfer station 314 and customer 308B may be an endpoint for virtual circuit 330A, and each of network service provider 320 and customer 308B may be an endpoint for virtual circuit 330B, with multiple virtual circuits 330 traversing one or more attachment circuits between a PE/PE or PE/CE pair for the IP/MPLS fabric 301 and the endpoints. A virtual circuit 330 represents a layer 3 path through IP/MPLS fabric 301 between an attachment circuit connecting a customer network to the fabric 301 and an attachment circuit connecting any of data transfer station 314 and network service provider 320 to the fabric 301. Each virtual circuit 330 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 330 may include a different hub-and-spoke network configured in IP/MPLS network 301 having PE routers 302, 304 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 330A, a router for data transfer station 314 may send a route to PE 304A via a routing protocol (e.g., eBGP) peering connection with PE 304A. PE 304A associates the route with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 310B via a routing protocol connection with PE 310B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to cloud service provider network 320A. PE router 312B of network service provider 320 may perform a similar operation. In this way, cloud exchange point 303 "leaks" routes from data transfer station 314 and network service provider 320 to customer networks 308, without these entities requiring a direct layer peering connection to customer networks 308.

PE routers 310B, 302A, 304A, and a router for data transfer station 314 may perform a similar operation in the reverse direction to forward routes originated by customer network 308B to the router for data transfer station 314 and thus provide connectivity from data transfer station to customer network 308B. In the example of virtual circuit 330B, PE routers 312B, 304A, 302A, and 310B exchange routes for customer network 308B and network service provider 320 in a manner similar to that described above for establishing virtual circuit 330A. As a result, cloud exchange point 303 within data center 300 internalizes the peering connections that would otherwise be established between PE 310B and each of the router for the data transfer station and PE 312B so as to perform cloud aggregation for unmanned vehicle transfer and metro connect transfer and thus deliver aggregated services to a customer network 308B having a single access link 316B to the cloud exchange point 303.

Absent the techniques described herein, fully interconnecting customer networks 308 and the different services would require peering connections between each of PEs 310 and at least one of the routers for each of the services. For instance, PE 310A would require a layer 3 peering connection with each of PEs 312 for layer 3 virtual circuits. With the techniques described herein, cloud exchange point 303 may fully interconnect customer networks 308 and cloud service provider networks 320 with one peering connection per site PE (i.e., for each of PEs 310 and PEs 312) by internalizing the layer 3 peering and providing data center-based 'transport' between cloud access and cloud aggregate interfaces.

In examples in which IP/MPLS fabric 301 implements BGP/MPLS IP VPNs or other IP-VPNs that use route targets to control route distribution within the IP backbone, PEs 304 may be configured to import routes from PEs 302 and to export routes received from PEs 312, using different asymmetric route targets. Likewise, PEs 302 may be configured to import routes from PEs 304 and to export routes received from PEs 310 using the asymmetric route targets. Thus, PEs 302, 304 may configured to implement advanced L3VPNs that each includes a basic backbone L3VPN of IP/MPLS fabric 301 together with extranets of any of customer networks 308 and any of data transfer station 314 and/or network service provider 320 attached to the basic backbone L3VPN. Each advanced L3VPN constitutes a service delivery network from data transfer station 314 and/or network service provider 320 to one or more customer networks 308, and vice-versa. In this way, cloud exchange point 303 enables any of data transfer station 314 and/or network service provider 320 to exchange cloud service traffic with any customer network 308 while internalizing the layer 3 routing protocol peering connections that would otherwise be established between pairs of customer networks 308 and data transfer station 314 and/or network service provider 320 for any service connection between a given pair. In other words, the cloud exchange point 303 allows each of customer networks 308 and data transfer station 314 and/or network service provider 320 to establish a single (or more for redundancy or other reasons) layer 3 routing protocol peering connection to the data center-based layer 3 cross-connect. By filtering routes from cloud service provider networks 320 to customer networks 308, and vice-versa, PEs 302, 304 thereby control the establishment of virtual circuits 330 and the flow of associated service traffic between customer networks 308 and data transfer station 314 and/or network service provider 320. Routes distributed into an MP-iBGP mesh may be VPN-IPv4 routes and be associated with route distinguishers to distinguish routes from different sites having overlapping address spaces.

Programmable network platform 305 may receive service requests for creating, reading, updating, and/or deleting end-to-end services of the cloud exchange point 303. In response, programmable network platform 305 may configure PEs 302, 304 and/or other network infrastructure of IP/MPLS fabric 301 to provision or obtain performance or other operations information regarding the service. Operations for provisioning a service and performed by programmable network platform 305 may include configuring or updating VRFs, installing SDN forwarding information, configuring LSPs or other tunnels, configuring BGP, configuring access links 316 and aggregation links 322, or otherwise modifying the configuration of the IP/MPLS fabric 301 to create virtual circuits 330A, 330B.

Figure 4:
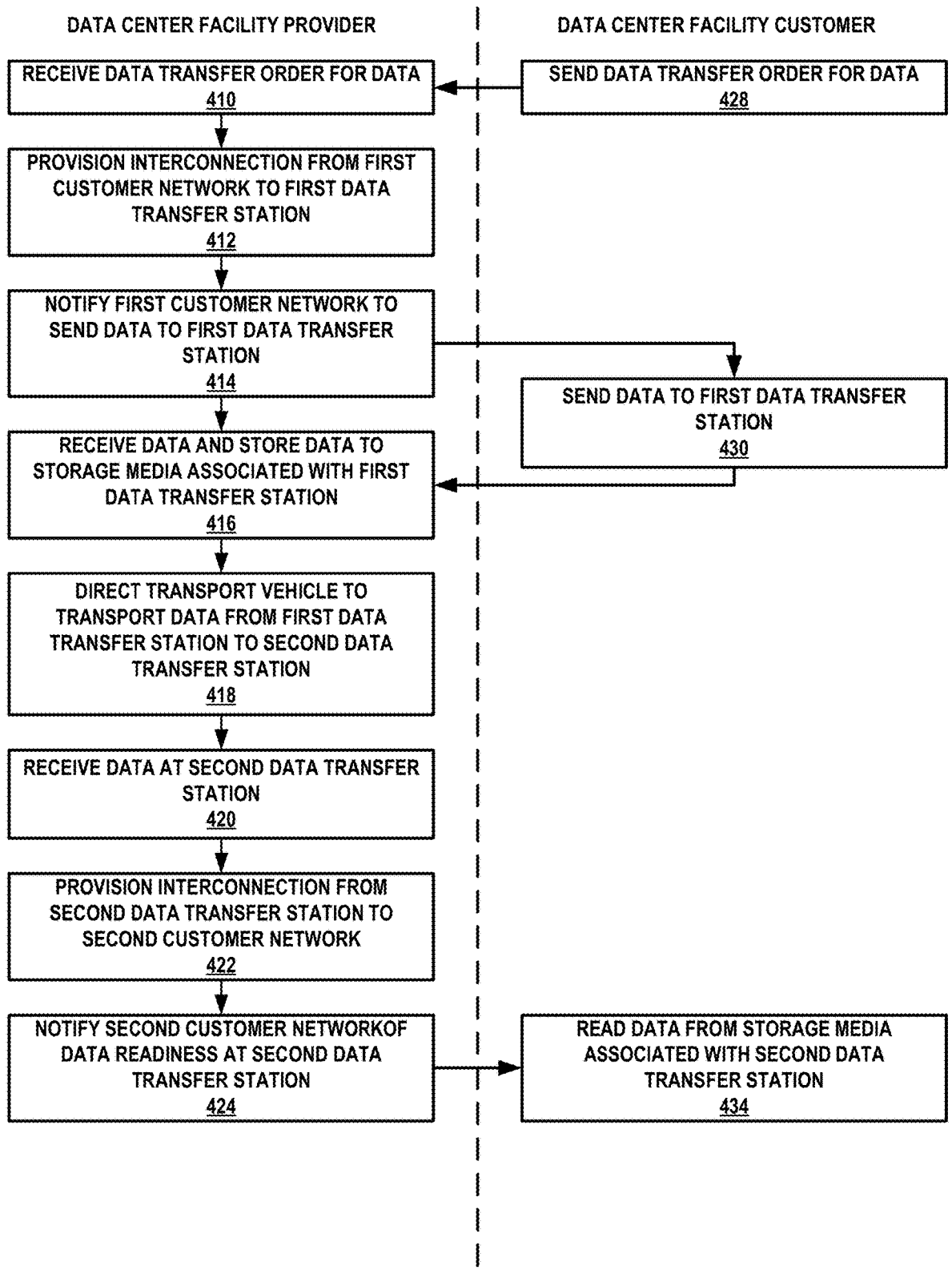
FIG. 4 is an example flowchart illustrating a data transfer method for data transfer between two customer networks, according to techniques discussed herein.

FIG. 4 is an example flowchart illustrating a data transfer method for data transfer between two customer networks, according to techniques discussed herein. Reference may be made to components in the example of FIG. 1. A customer of an interconnection system, such as interconnection system 2, may desire to transfer data from a first customer network (e.g. customer network 6A) located in a first data center (e.g. data center 8A) to a second customer network (e.g. customer network 6B) located in a second data center (e.g. data center 8B). The customer may input a data transfer order to a customer portal or service interface of the programmable network platform 3, such as by interacting with application(s) 5 (428). The data transfer order may include size information for the data, time information for the data transfer, location information for the data transfer, and customer preference information for the data transfer.

A programmable network platform (e.g. PNP 3) may receive the data transfer order (410). In some examples (not shown), the programmable network platform 3 may determine a data transfer method from at least an unmanned vehicle transfer method, such as steps 412-426, or a network transfer method, such as a temporary metro-connect via a network service provider. The programmable network platform 3 may determine a transfer time and/or a transfer cost from size information of the data, time information of the data transfer order, and location information of the data transfer order. The programmable network platform 3 may select a data transfer method based on a customer preference, such as transfer time reduction or transfer cost reduction, and based on the transfer time and/or transfer cost.

In the example of FIG. 4, the programmable network platform may provision a first interconnection (e.g. interconnection 9A) from the first customer network to a first data transfer station (e.g. data transfer station 12A) of the first data center (412). In some examples, the programmable network platform may provision the first interconnection using a network switch fabric (e.g. network switch fabric 10A). Once the first interconnection has been provisioned, the programmable network platform may notify the customer for the first customer network to send the data to the first data transfer station (414). The notification from the programmable network platform may include parameters for storing the data, such as an IP address or other resource identifier for a storage server or other storage device by which the first customer network may store the data.

The customer may send the data from the first customer network to the first data transfer station (430). The customer network may write the data to a storage media of a storage server of the data transfer station 212, or directly to a storage media of the transport vehicle 16 that includes storage server. The first data transfer station may receive the data and store the data to a storage media (e.g. storage media 202 of FIG. 2) associated with the first data transfer station (416). The programmable network platform 3 may direct a transport vehicle (e.g. transport vehicle 16) to transport the data from the first data transfer station to a second data transfer station (e.g. data transfer station 12B) (418). In some examples, the programmable network platform 3 may direct the transport vehicle by providing the controller for the transport vehicle with location information, time information, and connection information of at least one of first data transfer station and second data transfer station. The second data transfer station may receive the data (420).

The programmable network platform 3 may provision a second interconnection (e.g. interconnection 9B) from the second data transfer station to the second customer network (422). Once the second interconnection has been provisioned, the programmable network platform 3 may notify the customer for the second customer network of readiness of the data at the second data transfer station (424). That is, the second data transfer station has data available for the second customer network to read, retrieve, or otherwise obtain. The programmable network platform may send parameters for accessing the data to the second customer network, such as an IP address or other resource identifier for a storage server or other storage device by which the second customer network may obtain the data. The second customer network may read the data from a storage media associated with the second data transfer station (434). After the data has been read from the storage media, the second customer network may notify the programmable network platform that the read is complete. The programmable network platform may cause instances of the data to be erased, such as by erasing at least a portion of the storage media 202 or physical media 14.

Figure 5:
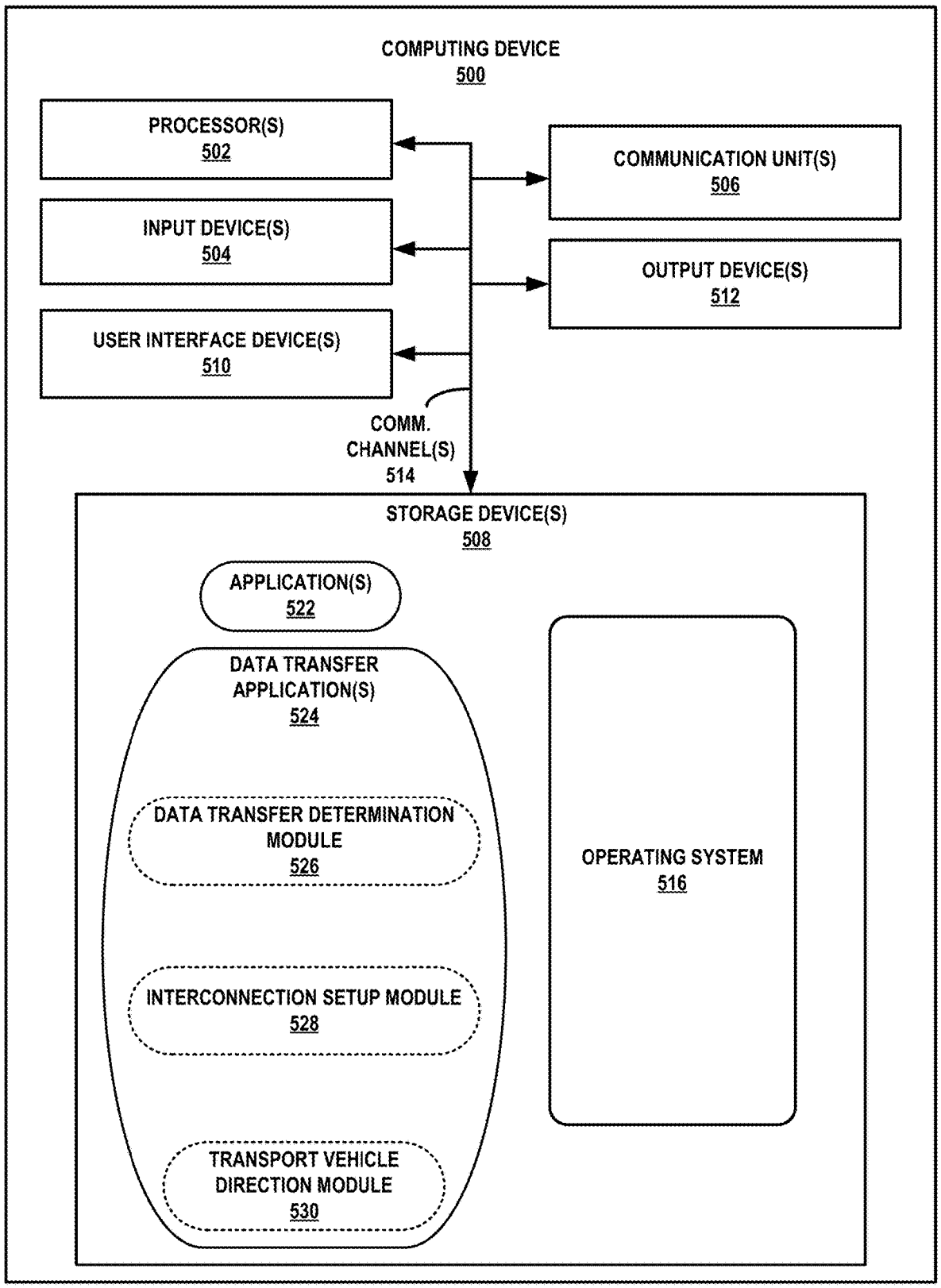
FIG. 5 is a block diagram illustrating further details of one example of a computing device that operates in accordance with one or more techniques of the present disclosure.

FIG. 5 is a block diagram illustrating further details of one example of a computing device that operates in accordance with one or more techniques of the present disclosure. FIG. 5 may illustrate a particular example of a server or other computing device 500 that includes one or more processor(s) 502 for executing any one or more of PNP 3, storage server 210, data transfer stations 12, or any other computing device described herein. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be co-located or in the same chassis as other components).

As shown in the specific example of FIG. 5, computing device 500 includes one or more processors 502, one or more input devices 504, one or more communication units 506, one or more output devices 512, one or more storage devices 508, and user interface (UI) device 510. Computing device 500, in one example, further includes one or more applications 522, data transfer application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and Wi-Fi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and programmable network platform application(s) 524 with processors 502, communication unit 506, storage device 508, input device 504, user interface devices 510, and output device 512.

Application 522 and data transfer application(s) 524 may also include program instructions and/or data that are executable by computing device 500. Example data transfer application(s) 524 executable by computing device 500 may include data transfer determination module 526, interconnection setup module 528, and transport vehicle direction module 530, each illustrated with dashed lines to indicate that these may or may not be executable by any given example of computing device 500.

Data transfer determination module 526 may include instructions for causing computing device 500 to perform one or more of the operations and actions described in the present disclosure with respect to data transfer determination. As one example, data transfer determination module 526 may include instructions that cause computing device 500 to determine a data transfer method for a data transfer order based on size information for the data, time information for the data transfer, location information for the data transfer, and/or customer preference information for the data transfer from the data transfer order.

Interconnection setup module 528 may include instructions for causing computing device 500 to perform one or more of the operations and actions described in the present disclosure with respect to interconnection setup and data transfer station control. As one example, interconnection setup module 528 may include instructions that cause computing device 500 to provision a first interconnection from a first customer network to a first data transfer station and a second interconnection from a second customer network to a second data transfer station.

Transport vehicle direction module 530 may include instructions for causing computing device 500 to perform one or more of the operations and actions described in the present disclosure with respect to transport vehicle direction. As one example, transport vehicle direction module 530 may include instructions that cause computing device 500 to direct a transport vehicle to transport data from a first data transfer station of a first interconnection facility to a second data transfer station of a second interconnection facility.

Figure 6:
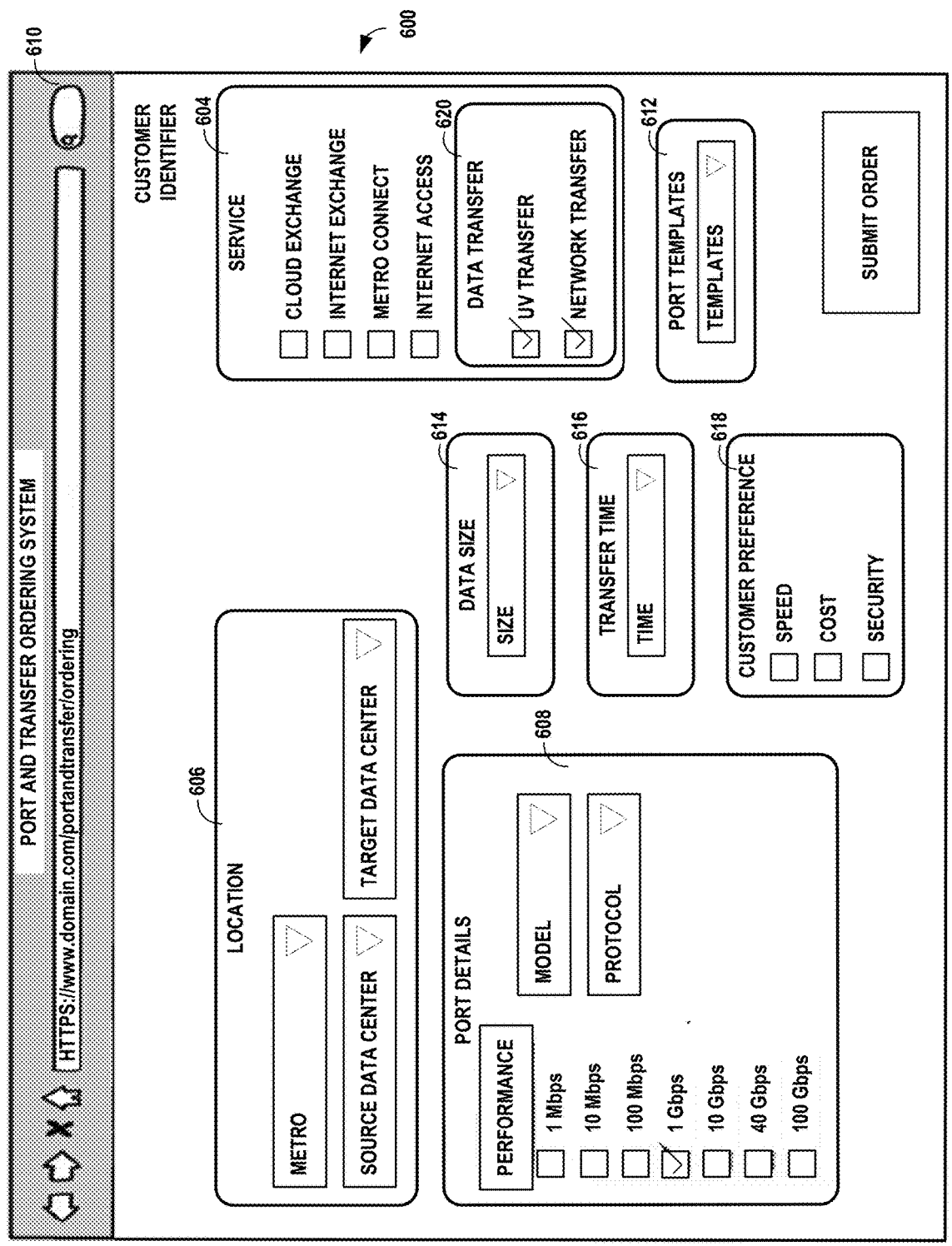
FIG. 6 is a block diagram illustrating an example data transfer ordering user interface with which to request a data transfer, in accordance with one or more techniques of the present disclosure.

FIG. 6 is a block diagram illustrating an example service ordering user interface 600 ("user interface 600") with which to request a data transfer, in accordance with one or more techniques of the present disclosure. In some examples, a portal to a programmable network platform, such as one of application(s) 5, may generate user interface 600 for display. In some examples, user interface 600 may be implemented as one or more HTML documents that may be rendered in a web browser 610. User interface 600 may be implemented in a standalone application that is executable on a mobile computing device, desktop computing device, or laptop device to name only a few examples, and that invokes a programmable network platform in a manner described herein. For example purposes, user interface 600 is illustrated in a web browser in FIG. 6.

As shown in FIG. 6, user interface 600 may allow a user to request a data transfer. User interface 600 includes user interface elements for requesting a data transfer.

User interface 600 may include a user interface element 606 that enables a user to select or otherwise specify location information, such as a geographic location two or more interconnection facilities for a data transfer. The geographic location may represent a metropolitan area ("metro") and the data center may identify a source data center of a first interconnection facility and a target data center of a second interconnection facility within the selected metro. To name only a few examples, user interface elements of interface 600 may be implemented as a drop-down menu that is pre-populated with available locations or may be implemented as a text input field in which the user may enter a location.

User interface 600 may include one or more user interface elements 604 that enable a user to select or otherwise specify a service through which the data transfer is to be performed. In the example of FIG. 6, example services include a cloud exchange, an Internet exchange, a metro connect service, an internet access service, and a data transfer service.

User interface 600 may include a user interface element 620 for selecting one or more data transfer methods. In the example of FIG. 6, user interface element 620 includes data transfer methods that includes UV (unmanned vehicle, e.g., transport vehicle 16) transfer and network transfer (e.g. network data transfer using a temporary metro-connect service).

In some examples, user interface 600 may include user interface elements, such as user interface elements 606, 614, 616, 618, that enable a user to provide PNP 3 with data information, time information, and customer preference information for determining a data transfer method. User interface 600 may include one or more user interface elements 614 that enable a user to enter size information for the data, such as by selecting or otherwise specifying a data size of the data transfer. User interface 600 may include one or more user interface elements 616 that enable a user to enter time information for the data transfer, such as by selecting or otherwise specifying a transfer time of the data transfer. For example, user interface elements 616 may allow a user to input a start time/date of the data transfer, a finish time/date of the data transfer, or a total transfer time of the data transfer. User interface 600 may include one or more user elements 618 that enable a user to enter customer preference information, such as by selecting or otherwise specifying a customer preference for the data transfer. In the example of FIG. 6, example customer preferences include a speed (time reduction) preference, a cost (cost reduction) preference, and a security preference (e.g. disconnection from vulnerable network).

User interface 600 may include one or more user interface elements 608 that enable a user to select or otherwise specify characteristics of a port associated with an interconnection used in the data transfer. In the example of FIG. 6, example performance requirements for the port, selectable by the user, include 1 Mbps, 10 Mbps, 100 Mbps, 1 Gbps, 10 Gbps, 40 Gbps, and 100 Gbps. The user may also select the form-factor or model for the requested port, as well as the Layer 1 protocol.

User interface 600 may include one or more user interface elements 612 that allow a user to order a new port based on one or more templates defined for port orders associated with a data transfer. For example, port configurations for requested ports may be stored as templates that may be recalled using user interface elements 612 for additional port requests.

User interface 600 may include a user interface element 602 to submit the selected and/or inputted values of user interface 600 for further processing. User interface element 602 is implemented as a button in FIG. 6. When user interface element 602 is selected, the selected and/or inputted values of user interface 600 may be processed to configure/provision the port and/or provide a determination of transfer time, transfer cost, or data transfer method.

In some examples, a customer may receive the user interface 600 via a customer portal for an interconnection system (e.g. interconnection system 2). The customer may select services and location for a requested data transfer. In some examples, the customer may enter technical information needed for port provisioning for an interconnection (e.g. interconnection 9A). In some cases, the customer may be able to duplicate a previous or existing port to reduce the amount of ordering details required to be entered. In some examples, the customer may enter time information, location information, size information, and/or customer preference information for the data request. The customer submits the data transfer order and, in some cases, may be presented with a data transfer time and date for the requested data transfer.

In some examples, such as data transfer with both "UV transfer" and "network transfer" selected as optional data transfer services for user interface element 604, PNP 3 may determine the data transfer time and date based on time information provided by user interface 600, such as time transfer 616. Upon receiving a submitted data transfer order, PNP 3 determines and selects a preferred data transfer method based on time information, location information, data information, and customer preference information entered through user interface elements 616, 606, 614, and 618, respectively.

Figures 7A, 7B:
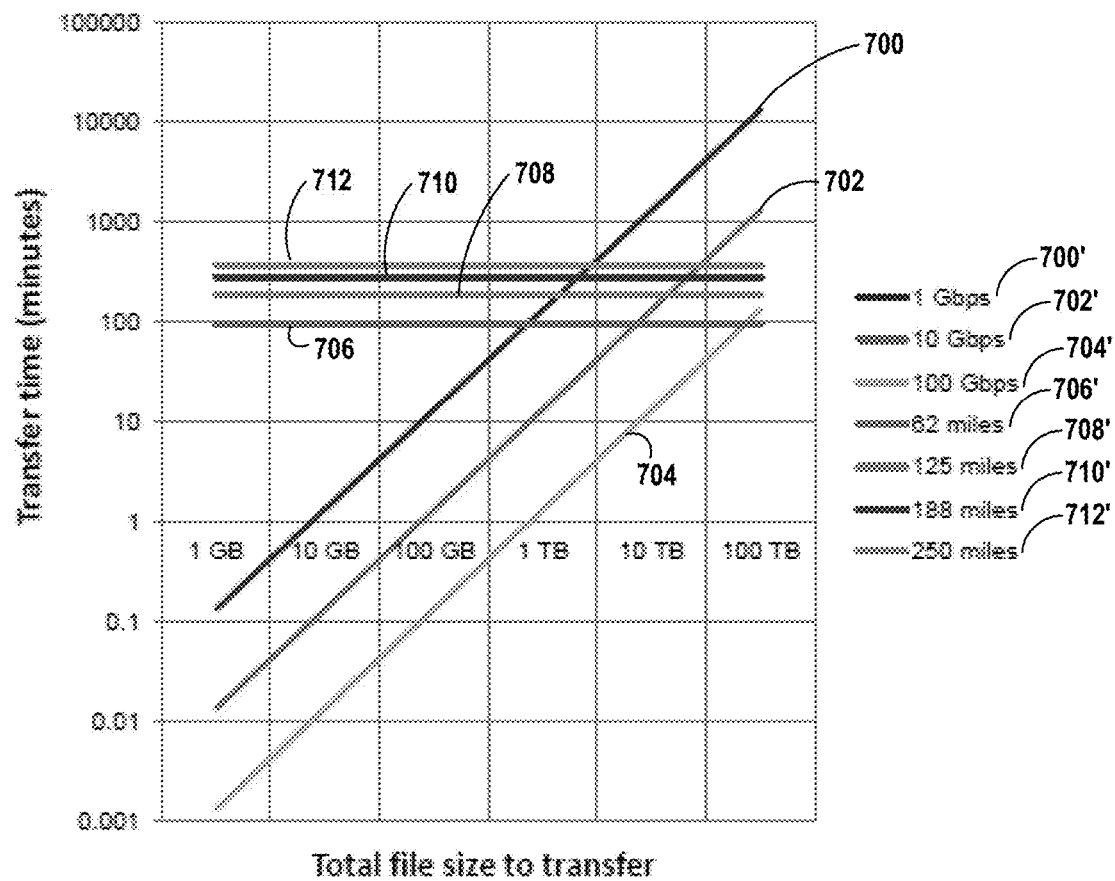
FIG. 7A is a graph of example data transfer size vs. transfer time for various transfer distances of an unmanned vehicle transfer and transfer speeds of a network data transfer, according to techniques disclosed herein.
FIG. 7B is a chart of example crossover data transfer sizes for various transfer distances and transfer speeds for a network data transfer and unmanned vehicle data transfer, according to embodiments disclosed herein.

FIG. 7A is a graph of example data transfer size vs. transfer time for various transfer distances of an unmanned vehicle transfer and transfer speeds of a network data transfer, according to techniques disclosed herein.

The data transfer size ("total file size") may represent size information of a data transfer order. The data transfer time may represent transfer time for a particular data transfer size and a particular transfer distance or a particular transfer speed. Each transfer speed may represent a transfer rate for a network data transfer by a network between two data centers. The transfer distance may represent a distance between the two data centers.

The graph of FIG. 7A may be a visual representation of example algorithms used in a determination, such as by PNP 3, of a transfer time for the unmanned vehicle data transfer and the network data transfer based on location information (transfer distance) and size information (transfer size) for a data transfer order, as well as selectable network transfer speeds (700', 702', 704'). PNP 3 may compare an expected transfer times for a network data transfer and for an unmanned vehicle data transfer using data information (data size), location information (transfer distance), and connection information (transfer speeds). PNP 3 may further evaluate, for example, time information such as an expected transfer time limit.

PNP 3 may select a data transfer method based on customer preference information. For example, if a customer had a data size of 100 GB and requests the fastest transfer time, PNP 3 may select a network data transfer. On the other hand, if a customer had a data size of 100 TB and requests the fasted transfer time, PNP 3 may select an unmanned vehicle data transfer. For the graph of FIG. 7A, MGbps is optical line speed or other data transfer speed between two data centers via a wired communication links, N miles is the distance between two data centers, and average unmanned vehicle speed is assumed to be 40 mph.

For example, line 700 depicts expected transfer times (y-axis) for various file sizes (x-axis) for a 1 Gbps communication link between data centers. Line 712 depicts an expected transfer time for various file sizes between data centers located 250 miles apart.

In other examples, PNP 3 may perform a further or alternative determination of a transfer cost for the unmanned vehicle data transfer and the network data transfer for a transfer distance and transfer speed. For example, a particular transfer speed of the network may have an associated cost for a particular data transfer size. A particular transfer distance may have an associated cost for a particular transfer distance and weight corresponding to a data size. PNP 3, for example, may determine a transfer cost using algorithms that may correspond to a graph of data transfer size vs. transfer cost for various transfer distances of an unmanned vehicle data transfer and/or transfer speeds of a network data transfer. PNP 3 may select a data transfer method based on a lower cost for the particular data size, transfer distance, and transfer speed.

FIG. 7B is a chart of example crossover data transfer sizes for various transfer distances and transfer speeds for a network data transfer and unmanned vehicle data transfer, according to embodiments disclosed herein. The crossover data transfer sizes may represent data transfer sizes for which data transfer using an unmanned vehicle may be faster than a network data transfer for higher data transfer sizes and slower for lower data transfer sizes.

For example, according to the chart, with an example unmanned vehicle speed of 40 mph and a 10 Gbps optical line between two data centers for a metro connect service: unmanned vehicle data transfer is faster for data transfers >7 TB for data centers up to 62 miles apart, and unmanned vehicle data transfer is faster for data transfers >28 TB for data centers up to 250 miles apart.

Different goals may be used for determining which transfer method to use to decide manner of data transfer at a given time. For example, the customer may seek to minimize total delay in data transfer, minimize total cost of data transfer, apply a greedy or optimal algorithm where the PNP 3 gathers transfer requests (weight, size, deadline) tuples and data split between disks will for multiple requests.

The PNP 3 may collects link/unmanned vehicle utilization metrics continuously and decides on allocation, and signal information regarding the unmanned vehicle to devices like switches/routers/unmanned vehicles.

Data may be defined by tuple (w, s), where W is weight of the disk/storage holding the data and S is the size of data.

Unmanned vehicles may be modeled as links with infinite bandwidth for transferring storage weighing less than permitted load unmanned vehicle can carry and zero bandwidth otherwise. Travel time for unmanned vehicles may be represented by a delay equal to distance between locations divided by average speed of unmanned vehicle, plus factor accounting for unmanned vehicles getting misplaced.

In general, storage for the unmanned vehicles may be physically rugged, with the data being encrypted, a provider vestibule may be used maintain physical access control with unmanned vehicle transfer. Examples mechanisms for placing storage in the data transfer station may be a robot and an ejection mechanism.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method, comprising:
    receiving, by a programmable network platform, a data transfer order for data from a first customer network located in a first data center to a second customer network located in a second data center, wherein the data transfer order includes time information indicating a requested time or date of transfer or delivery of the data and includes location information indicating a source or destination of the data;
    provisioning, by the programmable network platform and in response to receiving the data transfer order, a first interconnection from the first customer network to a first data transfer station of the first data center;
    notifying, by the programmable network platform and in response to provisioning the first interconnection, the first customer network to send the data to the first data transfer station;
    receiving, by the first data transfer station, the data and storing the data to a storage media associated with the first data transfer station;
    directing, by the programmable network platform, a transport vehicle to transport the data from the first data transfer station to a second data transfer station of the second data center, wherein the transport vehicle is an unmanned vehicle;
    receiving, by the second data transfer station, the data from the transport vehicle;
    provisioning, by the programmable network platform and in response to receiving the data transfer order, a second interconnection from the second data transfer station to the second customer network;
    notifying, by the programmable network platform, the second customer network of the readiness of the data at the second data transfer station; and
    transmitting, by the second data transfer station, the data to the second customer network.

2. The method of claim 1, wherein data transfer order is a first data transfer order, wherein the data is a first data, and further comprising:
    receiving, by a programmable network platform, a second data transfer order for second data from a first data center to a second data center;
    provisioning, by the programmable network platform, a third interconnection from a third customer network to the first data transfer station, wherein the third customer network is located in the first data center;
    notifying, by the programmable network platform, the third customer network to send the second data to the first data transfer station;
    receiving, by the first data transfer station, the second data and storing the second data to the storage media associated with the first data transfer station;
    directing, by the programmable network platform, the transport vehicle to transport the second data from the first data transfer station to the second data transfer station, wherein the first data and the second data are transported simultaneously;
    receiving, by the second data transfer station, the second data from the transport vehicle;
    provisioning, by the programmable network platform, a fourth interconnection from the second data transfer station to a fourth customer network located in the second data center;
    notifying, by the programmable network platform, the second customer network that the second data can be transferred; and
    transmitting, by the second data transfer station, the second data to the fourth customer network.

3. The method of claim 1, wherein directing the transport vehicle includes sending location information of the first data center and the second data center and connection information for the first data transfer station and the second data transfer station to the unmanned vehicle.

4. The method of claim 1, wherein the unmanned vehicle is an unmanned aerial vehicle.

5. The method of claim 1, wherein the unmanned vehicle is an unmanned ground vehicle.

6. The method of claim 1, wherein the transport vehicle includes the storage media.

7. The method of claim 1, wherein the data transfer order includes size information for the data and time information for the data transfer order, and location information for the data transfer order, and wherein the method further comprises determining, by the programmable network platform, a data transfer method of the data transfer order based on at least one of the size information, the time information, and the location information.

8. The method of claim 7, wherein the data transfer order is for first data and second data, and further comprising transferring, by the programmable network platform, the second data from the first data center and the second data center through a network connection.

9. The method of claim 7, wherein determining a data transfer method further comprises:
    determining a transfer time and transfer cost for an unmanned vehicle data transfer method and a network data transfer method based on at least one of the size information, the location information, and the time information; and
    selecting the unmanned vehicle data transfer method based on customer preference information.

10. The method of claim 9, wherein the customer preference information includes one of time reduction and cost reduction.

11. An interconnection system, comprising:
a first data center that includes a first data transfer station configured to receive data from a first customer network located in the first data center and transmit the data to a transport vehicle;
a second data center that includes a second data transfer station configured to receive the data from the transport vehicle and transmit the data to a second customer network located in the second data center;
a programmable network platform comprising processing circuitry and configured to:
receive a data transfer order for data from the first customer network to the second customer network, wherein the data transfer order includes time information indicating a requested time or date of transfer or delivery of the data and includes location information indicating a source or destination of the data;
provision, in response to receiving the data transfer order, a first interconnection from the first customer network to the first data transfer station;
notify, in response to provisioning the first interconnection, the first customer network to send the data to the first data transfer station;
direct a transport vehicle to transport the data from the first data transfer station to the second data transfer station, wherein the transport vehicle is an unmanned vehicle;
provision, in response to receiving the data transfer order, a second interconnection from the second data transfer station to the second customer network; and
notify the second customer network of readiness of the data at the second data transfer station.

12. The interconnection system of claim 11, wherein the unmanned vehicle is an unmanned aerial vehicle.

13. The interconnection system of claim 11, wherein the unmanned vehicle is an unmanned ground vehicle.

14. The interconnection system of claim 11, wherein each of the first data transfer station and the second data transfer station comprises:
the data storage;
a dock that includes a data connection configured to transmit the data to and from the respective first and second data transfer station; and
a port configured to connect to the respective first and second interconnection.

15. A computing device comprising:
at least one programmable processor operably coupled to a memory; and
a programmable network platform for a first data center and a second data center,
wherein the programmable network platform is configured for execution by the at least one programmable processor to:
receive a data transfer order for data from a first data center to a second data center, wherein the data transfer order includes time information indicating a requested time or date of transfer or delivery of the data and includes location information indicating a source or destination of the data;
provision, in response to receiving the data transfer order, a first interconnection from a first customer network to a first data transfer station of the first data center, wherein the first customer network is located in the first data center;
notify, in response to provisioning the first interconnection, the first customer network to send the data to the first data transfer station;
direct a transport vehicle to transport the data from the first data transfer station to a second data transfer station of the second data center, wherein the transport vehicle is an unmanned vehicle;
provision, in response to receiving the data transfer order, a second interconnection from the second data transfer station to a second customer network located in the second data center; and
notify the second customer network of readiness of the data at the second data transfer station.

16. A method comprising:
receiving, by a programmable network platform, a data transfer order for data from a first customer network located in a first data center to a second customer network located in a second data center, wherein the data transfer order includes time information indicating a requested time or date of transfer or delivery of the data and includes location information indicating a source or destination of the data;
provisioning, by the programmable network platform and in response to receiving the data transfer order, a first interconnection from the first customer network to a first data transfer station of the first data center;
notifying, by the programmable network platform and in response to provisioning the first interconnection, the first customer network to send the data to the first data transfer station;
directing, by the programmable network platform, a transport vehicle to transport the data from the first data transfer station to a second data transfer station of the second data center, wherein the transport vehicle is an unmanned vehicle;
provisioning, by the programmable network platform and in response to receiving the data transfer order, a second interconnection from the second data transfer station to the second customer network; and
notifying, by the programmable network platform, the second customer network of the readiness of the data at the second data transfer station.

* * * * *